United States Patent [19]
Watanabe et al.
[11] Patent Number: 4,738,871
[45] Date of Patent: Apr. 19, 1988

[54] HEAT-SENSITIVE RECORDING HEAD AND METHOD OF MANUFACTURING SAME

[75] Inventors: Michihiro Watanabe, Tsuchiura; Kazutaka Sato, Shimoinayoshi; Munetoshi Zen, Kashiwa; Kazuhiko Ato, Mito, all of Japan

[73] Assignee: Hitachi, Ltd., Tokyo, Japan

[21] Appl. No.: 890,627

[22] Filed: Jul. 30, 1986

[30] Foreign Application Priority Data

Aug. 2, 1985 [JP] Japan ........................ 60-169801

[51] Int. Cl.⁴ ........................ G01D 15/10; B05D 5/12; H05B 3/00

[52] U.S. Cl. ........................ 427/96; 427/53.1; 427/58; 427/289; 427/402; 219/216; 338/308; 338/309; 430/311; 346/76 PH

[58] Field of Search ........................ 346/76 PH; 219/216; 338/308, 309; 427/49, 58, 88, 96, 402, 404, 53.1, 289; 430/311

[56] References Cited

U.S. PATENT DOCUMENTS

| | | | |
|---|---|---|---|
| 3,099,540 | 7/1963 | Eisler . | |
| 4,105,892 | 8/1978 | Tashiro et al. | 219/216 |
| 4,160,897 | 7/1979 | Marino | 219/543 |
| 4,204,107 | 5/1980 | Ohkubo et al. | 219/216 |
| 4,472,875 | 9/1984 | Christian et al. | 29/577 C |

*Primary Examiner*—Clifford C. Shaw
*Assistant Examiner*—Gerald E. Preston
*Attorney, Agent, or Firm*—Antonelli, Terry & Wands

[57] ABSTRACT

The first and second electrodes, to which a recording signal is to be applied, are printed to a desired pattern on an insulating substrate by, for example, a screen printing method. A heating resistor is formed by, for example, a screen printing method so as to be bridged over these first and second electrodes. A protective layer is formed so as to cover the first and second electrodes and heating resistor therewith. Each of the heating portions of the heating resistor is provided with one or a plurality of laser-made holes, and the resistance value of each heating portion of the heating resistor is regulated to a predetermined level on the basis of the number of the laser-made holes.

26 Claims, 2 Drawing Sheets

HEAT-SENSITIVE RECORDING HEAD AND METHOD OF MANUFACTURING SAME

BACKGROUND OF THE INVENTION

1. Field of the Invention

This invention relates to a heat-sensitive recording head, and a method of manufacturing the same, and more particularly to a thick film type heat-sensitive recording head applied to a facsimile and a printer, and a method of manufacturing the same.

2. Description of the Prior Art

A heat-sensitive recording head is generally provided on a substrate with a heating resistor having a plurality of finely spaced heating portions, and electrodes for selectively applying a recording signal current to the heating portions of the heating resistor, and adapted to apply the heat, the quantity of which is in accordance with that of Joule heat of the heating resistor, to a recording medium and thereby carry out the recording of data. The conventional heat-sensitive recording heads include a thin film type heat-sensitive recording head and a thick film type heat-sensitive recording head, which are different in the materials and manufacturing methods for their heating resistors.

A thin film type heat-sensitive recording head is manufactured as disclosed in, for example, the specification of U.S. Pat. No. 4,343,986, by forming a resistor on a substrate by the evaporation or sputtering of a metal, and finishing the resistor to a desired shape by a photo-etching means. This thin film type heat-sensitive recording head has excellent properties but the manufacturing method is complicated and requires a large number of manufacturing steps.

A thick film type heat-sensitive recording head is manufactured as disclosed in, for example, the specification of U.S. Pat. No. 4,203,025, by printing the surface of a substrate with a pattern of a resistor paste material by using a screen on which a desired pattern is formed in advance; and then dry-backing the paste material to form a desired resistor. This thick film type heat-sensitive recording head can be manufactured by a very simple method at a low cost as compared with a thin film type heat-sensitive recording head. However, the resistance value of each resistor widely scatters due to the shape errors thereof including the bending thereof caused by the electrodes, and the scatter of the width and intervals of the electrodes, and the material errors including the errors of the mixing ratio of a mixing material, such as a solvent. The calorific power of the heating portions of the heating resistor is proportional to $V^2/R$ wherein V is an applied voltage; and R the resistance value of the heating resistor. Accordingly, the calorific power difference causes the unevenness of optical density, so that a heating resistor causing such an inconvenience does not sufficiently serve the purpose of reproducing, especially, an image of a high quality, such as an image of a high gradation of full color.

SUMMARY OF THE INVENTION

An object of the present invention is to provide a heat-sensitive recording head having minimized scatter of the resistance value of the heating portions of a heating resistor and capable of serving the purpose of reproducing a high-quality image having minimized unevenness of optical density, and a method of manufacturing such heat-sensitive recording heads.

In a heat-sensitive recording head according to the present invention, one or a plurality of holes are formed in the heating portions of a heating resistor provided on a substrate, and the resistance value of each heating portion is regulated to a predetermined level by these holes.

The holes for use in regulating the scatter of resistance values of the heating portions are made by, for example, a laser boring apparatus. During a laser boring operation, the variations in the resistance value based on the number of the holes are detected by a resistance value detecting means. When the resistance value has reached a predetermined level, the laser boring operation is stopped to complete the regulation of the resistance value of the heating portions.

DESCRIPTION OF THE PREFERRED EMBODIMENTS

Figure 1:
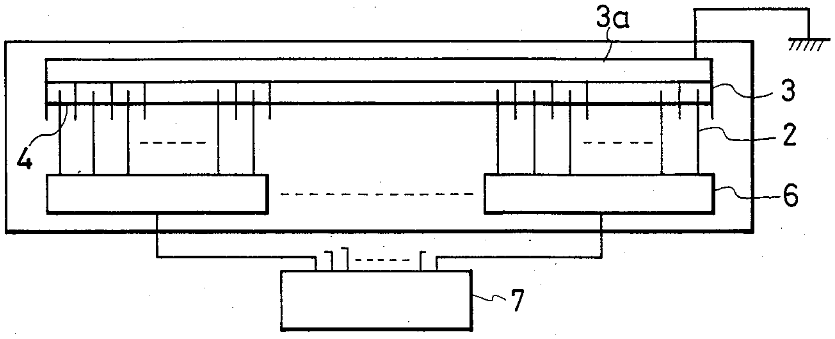
FIG. 1 shows the construction of an embodiment of the heat-sensitive recording head according to the present invention.

An embodiment of the heat-sensitive recording head according to the present invention will now be described with reference to FIGS. 1–3.

First and second electrodes 2, 3, to which a recording signal is to be applied, are arranged linearly on one surface of an insulating substrate 1 of alumina. These first and second electrodes 2, 3 are formed by printing conductive paste, the main component of which is a noble metal, for example, gold, to a desired pattern on the substrate 1 by a screen printing method, drying the conductive paste at about 120° C. for about 20 minutes, and baking the resultant pattern at about 850°–900° for about 30–60 minutes. In this embodiment, the first and second electrodes 2, 3 are arranged alternately at a constant pitch. A recording signal is applied selectively to the first electrodes 2, and the second electrodes 3 are used as common electrodes.

In this embodiment, six first electrodes 2 are arranged linearly per a 1 mm-wide space, and a total of 512 first electrodes 2 are arranged at intervals of 166 μm. The second electrodes 3 are arranged on both sides of each of the first electrodes 2. A total of eight driving IC circuits 6 are provided, each of which is connected to one set, i.e. 64 pieces of first electrodes 2. An image signal is applied selectively from an image signal generating circuit 7 to these IC circuits 6. The second electrodes 3 are earthed through a common portion 3*a*.

A heating resistor 4 is provided so as to be bridged over a portion of each of the alternately arranged first and second electrodes 2, 3. The heating resistor 4 is formed by coating the surface of the substrate 1 and the surfaces of predetermined portions of the electrodes 2, 3 with resistor paste of ruthenium oxide ($RuO_2$) to width of about 300 μm and a desired thickness by a screen printing method, drying the resistor paste at about 120° C.-150° C., and baking the dried product at about 850°-900° C. for about 30-60 minutes. As a result, the heating resistor 4 has heating portions 4a between the alternately arranged first and second electrodes 2, 3.

The glass paste of a low melting point is printed by a screen printing method on the resultant product so as to cover the heating resistor 4 and parts of the first and second electrodes 2, 3, drying the resultant paste at about 120° C. for about 20 minutes, and baking the resultant product at about 600° C. for about 30 minutes to form a wear-resisting protective layer 5. During the formation of this heating resistor 4, consideration is given to the resistance value of each heating portion 4a so that it becomes lower than a predetermined level. However, the resistance values scatter around 20% in practice.

In this embodiment, the scatter of the resistance values of the heating portions 4a of the heating resistor 4 is regulated before the protective layer 5 has been formed. The regulation of the resistance values of the heating portions 4a of the heating resistor 4 is carried out by a trimming operation by, for example, a laser boring apparatus.

Figure 4:
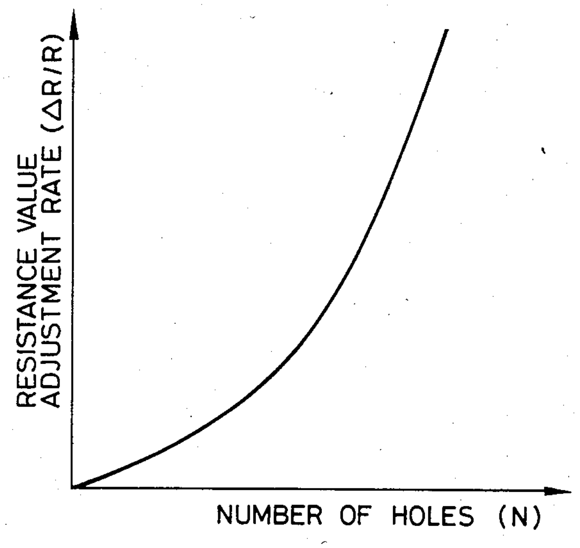
FIG. 4 is a graph showing the relation between the number of laser-formed holes in a unit heating portion of a heating resistor and the resistance value of the heating portion.

A trimming operation by the laser boring apparatus generally causes an increase in the resistance value. FIG. 4 shows an example of the results of measurement of variations in a resistance value during a trimming operation by a laser boring apparatus. As may be understood from the drawing, the resistance values increase linearly or secondary-functionally in almost all cases. In accordance with this tendency of increase in the resistance values, the number of holes, which are made by a laser boring apparatus, is increased as the resistance value is monitored, to carry out the regulation of the resistance value.

During a trimming operation by a laser boring apparatus, a plurality of holes are usually made. The holes 25 are made in each heating portion 4a by laser so that they are arranged in a staggered manner, to thereby set the resistance values in each heating portion 4a in a balanced state. In this embodiment, the number of the laser-made holes 25 is around 1-10, and the size of laser-made hole 25 is set to around 20 μm at the largest, and to not more than 10 μm normally. The area ratio of a laser-made hole to a heating portion 4a is set to 30% at the highest, and to not more than 20% normally. The reason why limitation is placed on these number, values and percentages resides in that, when they have become larger, the strength of the heating portion 4a decreases and the distribution of heat in thereof becomes worse.

Figure 5:
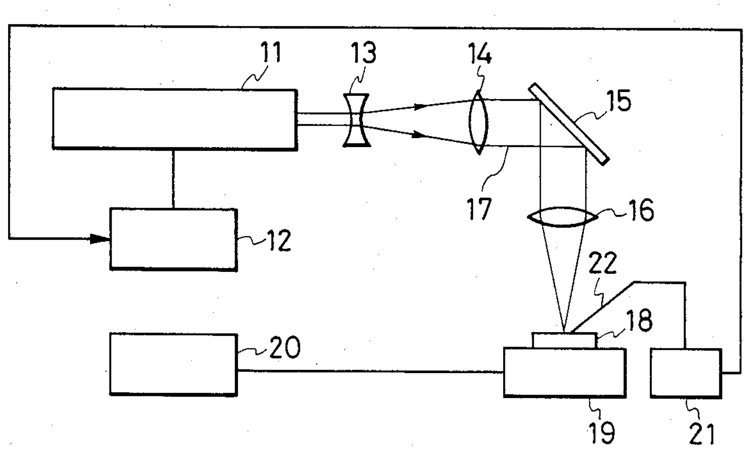
FIG. 5 is a schematic diagram of a laser-boring apparatus, an example of a resistance value regulator used in the production of the heat-sensitive recording head according to the present invention.

FIG. 5 is a schematic construction diagram of an example of a laser boring apparatus. This laser boring apparatus consists of a laser source 11, a laser source control system 12, an optical system 17 composed of a first optical lens 13, a second optical lens 14, a reflector 15 and a third optical lens 16, a precision X-Y table 19 used to regulate the heating portions of the heating resistor and provided with a heat-sensitive recording head 18 thereon, an X-Y table control system 20, a pin prober 22 used to monitor the resistance values of the heating portions of the heating resistor in the heat-sensitive recording head 18, and a resistance value recorder 21 used to record the resistance values monitored by the pin prober 22 and feed back the same values to the laser source control system 12.

In order to carry out the regulation of the resistance values of the heating portions 4a of the heating resistor 4 by using the above-mentioned laser boring apparatus, the heat-sensitive recording head 18, for which the resistance value regulation is to be done, is placed on the precision X-Y table 19 first. Before this time, the optical system 17 is already regulated to form a spot of a predetermined diameter of the laser, which is generated by the laser source 11, on the surface of the heating resistor in the heat-sensitive recording head 18.

The laser source 11 is then operated to apply laser to a heating portion of the heating resistor and make holes therein. Every time one hole is made, the precision X-Y table 19 is moved by the table control system 20 to make another hole. During the trimming operation consisting of this laser boring operation, the resistance values are monitored one by one by the pin prober 22 and recorded in the resistance value recorder 21. When the monitored resistance value has reached a set level, a feedback signal is generated from the resistance value recorder 21 to feed back the resistance value to the laser source control system 12. The laser source 11 is then stopped to interrupt the laser-boring operation. During this laser-boring operation, the precision X-Y table 19 is operated so that the holes are made in a staggered manner as mentioned above. When the resistance-value regulation of one heating portion has thus been completed, the precision X-Y table 19 is operated, and the resistance value of a subsequent heating portion is regulated in the same manner.

This resistance value regulating operation is carried out generally by a method consisting of the steps of roughly regulating the resistance value by making a plurality of holes except a final hole by the laser, and finely regulating the resistance value during the formation of a final hole by the laser, by finely moving the laser spot so as to gradually increase the diameter of the same hole.

Figure 2:
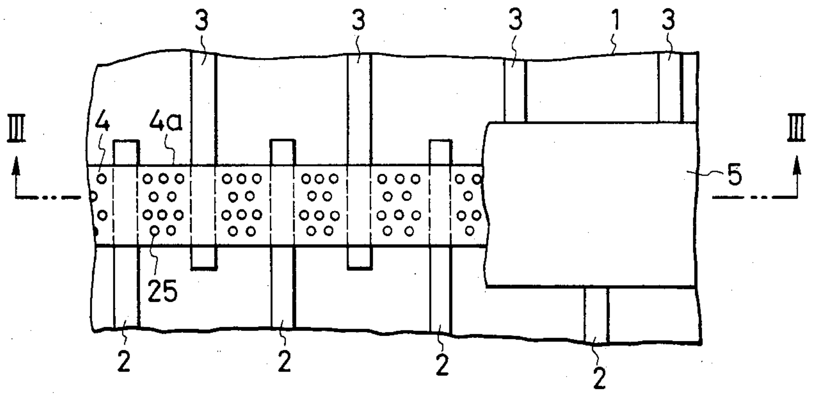
FIG. 2 is an enlarged view of a principal portion of the embodiment of FIG. 1.
Figure 3:
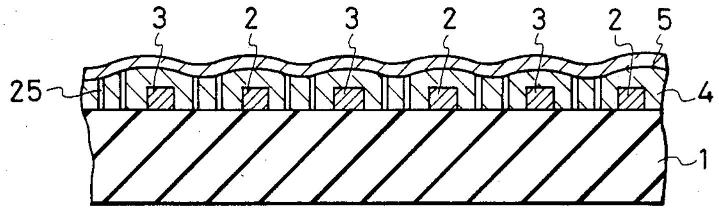
FIG. 3 is a cross-sectional view taken along the line III—III in FIG. 2.

At the end of such an operation for regulating the resistance values of the heating portions of the heating resistor by using a laser boring apparatus, a plurality of laser-formed holes 25 are made in a staggered manner in each of the heating portions 4a of the heating resistor 4 as shown in FIGS. 2 and 3.

In this embodiment, the protective layer 5 is formed by carrying out the screen-printing of a paste material, and then dry-baking the paste material, after the completion of the regulation of the resistance values of the heating portions 4a of the heating resistor, as mentioned previously.

The regulation of the resistance values can also be carried out in a different manner. Namely, after the protective layer 5 has been formed, the laser may be applied in the same manner as mentioned above from a position above the protective layer 5 thereto by using the above-mentioned laser-boring apparatus to carry out a trimming operation, in which holes are made through the protective layer 5 and heating portions 4a of the heating resistor 4 by the laser, whereby the resistance values are regulated.

When this method is used, it becomes necessary that the burrs occurring on the outer surface of the protective layer 5 be removed. However, if the diameter of the holes made by the laser is sufficiently small, the regulation of the resistance values can be done more accurately.

Recording an image on a recording medium by the heat-sensitive recording head constructed as mentioned above is done, for example, in the following manner.

First, a recording medium is brought into contact with the heating resistor in the heat-sensitive recording head. A recording signal current is then applied selectively between the first and second electrodes 2, 3 in the heat-sensitive recording head. Consequently, the heating portion 4a thus selected of the heating resistor 4, which is between the first and second electrodes 2, 3 generates Joule heat due to the resistance value of this heating portion 4a. This Joule heat causes a desired portion of the recording medium to be colored, and a desired recording operation is carried out. This recording operation enables a high-quality printed image to be obtained owing to the minimized scatter of resistance values based on the regulation of the resistance values of the heating portions 4a of the heating resistor 4.

In each of the above-described embodiments, the first and second electrodes 2, 3 are formed on the substrate 1 so as to be arranged alternately. The heating portions 4a of the heating resistor 4 are formed between the first and second electrodes 2, 3. However, the first and second electrodes 2, 3 are not necessarily arranged alternately. They may be arranged, for example, in opposition to each other, and the heating portions of the heating resistor may be formed between these opposed first and second electrodes.

According to the present invention described above, the scatter of resistance values of the heating portions of the heating resistor can be minimized, and the recording of a high-quality image can be done.

What is claimed is:

1. A method of manufacturing a heat-sensitive recording head having a plurality of first electrodes and a plurality of second electrodes formed on a substrate, said first electrodes being provided so as to have a recording signal applied thereto, said second electrodes being provided as common electrodes, a heating resistor bridged over the predetermined portions of said first electrodes and said second electrodes to form a plurality of heating portions on said heating resistor, and a protective layer formed so as to protect parts of said first electrodes and said second electrodes and said heating resistor, comprising the steps of:

forming said heating resistor by coating said substrate with a resistor paste so as to be bridged over the predetermined portions of said first electrodes and said second electrodes, and drying and baking said paste;

forming holes in said heating portions of said heating resistor by using a boring apparatus, while detecting variations, which occur on a basis of the number of said holes, in a resistance value of each of said heating portions; and stopping the hole-making operation of said boring apparatus when the resistance value of each of said heating portions has reached, respectively, a predetermined level, to regulate the resistance value of said heating portions of said heating resistor.

2. A method of manufacturing heat-sensitive recording heads according to claim 1, wherein said plurality of first electrodes are provided in a parallel, spaced relation, said plurality of second electrodes are provided in a parallel, spaced relation, said plurality of first electrodes and said plurality of second electrodes being arranged alternately and at a constant pitch.

3. A method of manufacturing heat-sensitive recording heads according to claim 1, wherein said plurality of first electrodes are provided in a parallel, spaced relation, said plurality of second electrodes are provided in a parallel, spaced relation, said plurality of first electrodes and said plurality of second electrodes being arranged so as to oppose one another.

4. A method of manufacturing heat-sensitive recording heads according to claim 1, wherein said heating resistor is provided as a single, continuous heating resistor.

5. A method of manufacturing heat-sensitive recording heads according to claim 1, wherein each of said heating portions is provided with a plurality of resistance value-regulating holes, said holes being arranged in a staggered manner.

6. A method of manufacturing heat-sensitive recording heads, comprising the steps of:

forming a plurality of first electrodes and a plurality of second electrodes, said first electrodes being provided so as to have a recording signal selectively applied thereto, said second electrodes being provided as common electrodes, said first electrodes and said second electrodes being formed on a substrate by printing conductive paste to a desired pattern thereon by a screen printing method;

forming a heating resistor by coating said substrate with a resistor paste to a desired thickness so that a layer of resistor paste is bridged over the predetermined portions of said first electrodes and said second electrodes, and then drying and baking said resistor paste to form heating portions on bridge sections of said heating resistor;

making holes in said heating portions of said heating resistor by using a laser-boring apparatus, while detecting variations, which occur on a basis of the number of said holes, in a resistance value of a heating portion of said heating resistor;

stopping the laser-boring operation of said laser-boring apparatus to carry out a regulation of the resistance value of each of said heating portions of said heating resistor when the resistance value of each of said heating portions has reached, respectively, a predetermined level; and forming a protective layer by coating parts of said first electrodes and said second electrodes and said heating resistor with a protective material, and drying and baking said protective layer thus formed.

7. A method of manufacturing heat-sensitive recording heads according to claim 6, wherein, in order to carry out the regulation of the resistance value of a heating portion by making holes in a heating portion of said heating resistor by said laser-boring apparatus, the resistance value is regulated roughly first by a laser-boring operation, and then finely by moving a laser spot so as to gradually increase the diameter thereof.

8. A method of manufacturing heat-sensitive recording heads according to claim 6, wherein a heat-sensitive recording head is placed on an X–Y table in said laser-boring apparatus, said X–Y table being moved finely to determine the position, in which a hole is to be made by the laser, on a heating portion of said heating resistor, and thereby make holes by the laser so that said holes are arranged in a desired manner.

9. A method of manufacturing heat-sensitive recording heads according to claim 7, wherein said plurality of first electrodes are provided in a parallel, spaced relation, said plurality of second electrodes are provided in a parallel, spaced relation, said plurality of first electrodes and said plurality of second electrodes being arranged alternately and at a constant pitch.

10. A method of manufacturing heat-sensitive recording heads according to claim 6, wherein said plurality of first electrodes are provided in a parallel, spaced relation, said plurality of second electrodes are provided in a parallel, spaced relation, said plurality of first electrodes and said plurality of second electrodes being arranged so as to oppose one another.

11. A method of manufacturing heat-sensitive recording heads according to claim 6, wherein said heating resistor is provided as a single, continuous heating resistor.

12. A method of manufacturing heat-sensitive recording heads according to claim 6, wherein each of said heating portions is provided with a plurality of resistance value-regulating holes, said holes being arranged in a staggered manner.

13. A method of manufacturing heat-sensitive recording heads, comprising the steps of:

forming a plurality of first electrodes and a plurality of second electrodes by printing a conductive paste to a desired pattern on a surface of a substrate by a screen printing method, said first electrodes being provided so as to have a recording signal applied thereto and said second electrodes being provided as common electrodes;

forming a heating resistor by coating said surface of said substrate with a resistor paste to a desired thickness so that said paste is bridged over parts of said plurality of first electrodes and said second electrodes, and drying and baking said resistor paste to thereby form heating portions of said heating resistor, said heating portions being sections of said heating resistor which are bridged over said first electrodes and said second electrodes;

forming a protective layer by coating said plurality of first electrodes and said second electrodes and said heating resistor with a protective material so as to cover the same therewith, and then drying and baking said protective material;

making holes through said protective layer and each of said heating portions of said heating resistor by a laser-boring apparatus while detecting variations, which occur on a basis of a number of said holes, in a resistance value of each of said heating portions;

stopping the laser-boring apparatus when said resistance value of each of said heating portions has reached a predetermined level, to thereby regulate said resistance value of each of said heating portions of said heating resistor; and thereafter processing the surface of said protective layer.

14. A method of manufacturing heat-sensitive recording heads according to claim 13, wherein, in order to carry out the regulation of the resistance value of a heating portion by making holes in a heating portion of said heating resistor by said laser-boring apparatus, the resistance value is regulated roughly first by a laser-boring operation, and then finely by moving a laser spot so as to gradually increase the diameter thereof.

15. A method of manufacturing heat-sensitive recording head according to claim 13, wherein a heat-sensitive recording head is placed on an X–Y table in said laser-boring apparatus, said X–Y table being moved finely to determine the position, in which a hole is to be made by the laser, on a heating portion of said heating resistor, and thereby make holes by the laser so that said holes are arranged in a desired manner.

16. A method of manufacturing heat-sensitive recording heads according to claim 13, wherein said plurality of first electrodes are provided in a parallel, spaced relation, said plurality of second electrodes are provided in a parallel, spaced relation, said plurality of first electrodes and said plurality of second electrodes being arranged alternately and at a constant pitch.

17. A method of manufacturing heat-sensitive recording heads according to claim 13, wherein said plurality of first electrodes are provided in a parallel, spaced relation, said plurality of second electrodes are provided in a parallel, spaced relation, said plurality of first electrodes and said plurality of second electrodes being arranged so as to oppose one another.

18. A method of manufacturing heat-sensitive recording heads according to claim 13, wherein said heating resistor is provided as a single, continuous heating resistor.

19. A method of manufacturing heat-sensitive recording heads according to claim 13, wherein each of said heating portions is provided with a plurality of resistance value-regulating holes, said holes being arranged in a staggered manner.

20. A method of manufacturing a heat-sensitive recording head comprising:

a step (a) of forming a plurality of spaced recording electrodes on a major surface of an insulating substrate;

a step (b) of forming a plurality of spaced common electrodes on said major surface of said insulating substrate so as to leave a gap between each of said recording electrodes and each of said common electrodes;

a step (c) of coating said major surface of said substrate with a resistor paste, drying and baking said resistor paste so as to provide a heating resistor bridging portions of each of said recording electrodes and each of said common electrodes, said heating resistor having a plurality of heating portions, each of said heating portions bridging one of said recording electrodes and one of said common electrodes;

a step (d) of boring at least one hole in one of said heating portions while detecting a resistance of said one of said heating portions until said resistance reaches a predetermined value at which time the boring is stopped;

a step (e) of repeating said step (d) for each of a plurality of said heating portions; and a step (f) of forming a protective layer over said recording electrodes, said common electrodes and said heating resistor, whereby scatter of resistance values of said heating portions can be minimized.

21. A method of manufacturing a heat-sensitive recording head according to claim 20, wherein said plurality of recording electrodes are provided in a parallel, spaced relation, said plurality of common electrodes are provided in a parallel, spaced relation, said plurality of recording electrodes and said plurality of common electrodes being arranged alternately and at a constant pitch.

22. A method of manufacturing a heat-sensitive recording head according to claim 20, wherein said plurality of recording electrodes are provided in a parallel, spaced relation, said plurality of common electrodes are provided in a parallel, spaced relation, said plurality of recording electrodes and said plurality of common electrodes being arranged so as to oppose one another.

23. A method of manufacturing a heat-sensitive recording head according to claim 20, wherein said at least one hole is bored by a laser of a laser-boring apparatus.

24. A method of manufacturing a heat-sensitive recording head according to claim 20, wherein said protective layer is formed after said step (d) and said step (e).

25. A method of manufacturing a heat-sensitive recording head according to claim 20, wherein said protective layer is formed before said step (d) and said step (e) and said holes are also bored through said protective layer.

26. A method of manufacturing a heat-sensitive recording head according to claim 20, wherein one to ten holes are bored in each of said plurality of heating portions, each of said holes having a size less than or equal to 20 μm.

* * * * *